Nov. 3, 1942.   E. H. WARCH ET AL   2,300,604
SPECTACLE CASE
Filed May 31, 1940
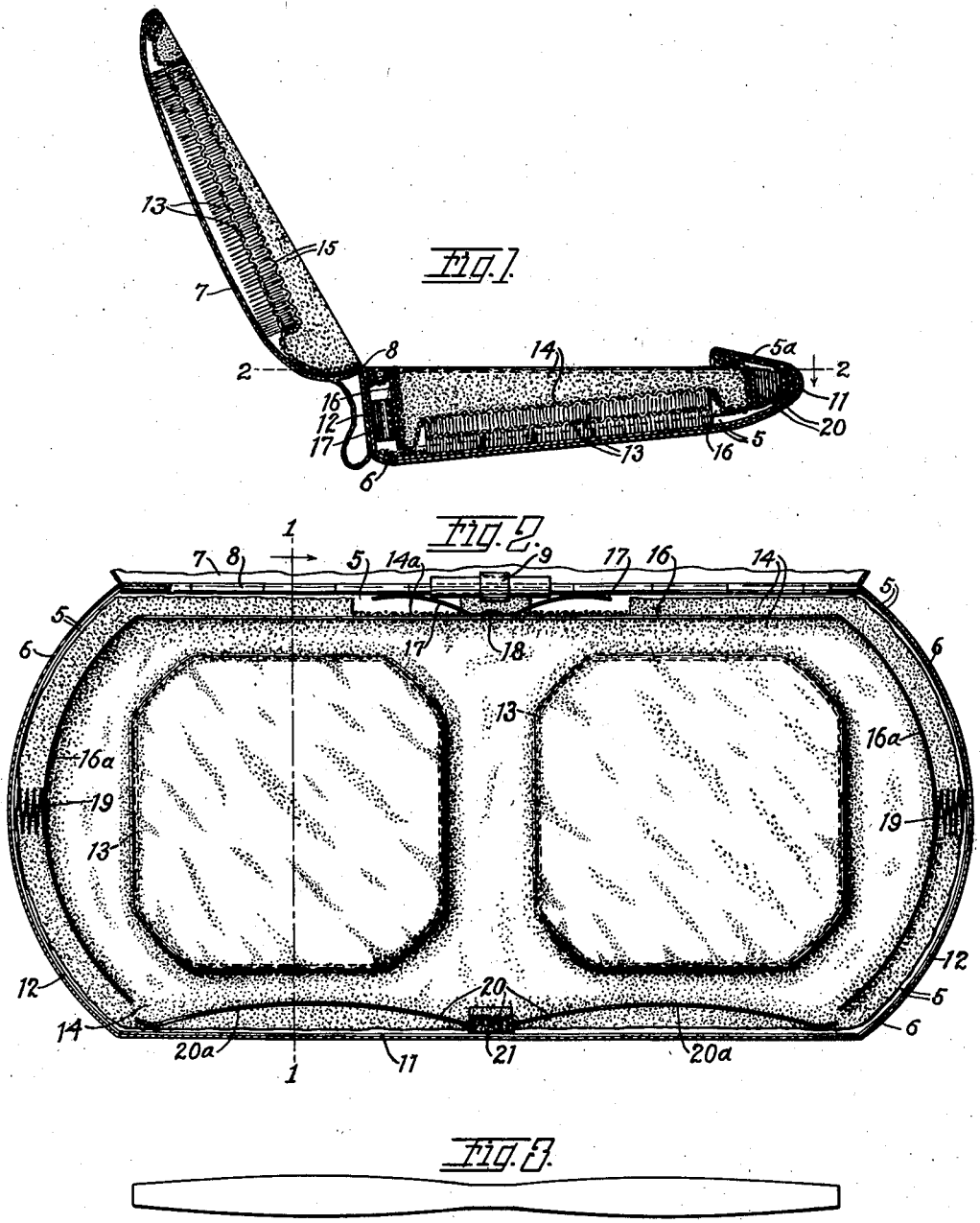

Patented Nov. 3, 1942

2,300,604

UNITED STATES PATENT OFFICE 2,300,604

SPECTACLE CASE

Ernest H. Warch and Herbert H. Hupfeldt, Baltimore, Md.

Application May 31, 1940, Serial No. 338,190

6 Claims. (Cl. 206—6)

This invention relates to eyeglass and spectacle cases, and especially to an improved spectacle case.

In previously patented eyeglass cases, cushions have been so arranged in the tray and cover that, when the eyeglasses are in the closed cases, the lenses are gripped or clamped by the cooperating cushions; and by this repeated and continual gripping or clamping, the cushions are compacted, so that any shock or impact that is received by the casing is thereby transmitted to the lenses of the eyeglasses. The tray and cover are of thin and light material that may become dented by falling from a user's pocket or hand, or from other causes, and a dent opposite to one of the cushions causes it to bulge inwardly and result in subjecting one or both lenses to a torsion and consequent strain at the bridge-fastening such as is usual in rimless eyeglasses, viz., at a hole drilled through the respective lenses; so if the casing receives a shock or impact while the lenses are thus clamped and strained, the user is likely to find one of the bridge-fastenings broken.

In a certain prior patent, spring-clamps are employed to clamp the respective lenses, and in case a shock is received at a point opposite to one of these clamps, it is likely to yield while the other continues its grip, thus straining the bridge-fastenings at the instant the shock is received, quite likely resulting in breakage of the bridge-fastenings.

Another prior patent contemplates "lens receiving recesses," in which the lenses are supported by "supporting means for the opposite ends of the lenses." Such supporting means tightly clamps the bridge and temples; so, the lenses are free to vibrate and subject the bridge-fastenings to such torsional strains as to be likely to break the bridge-fastenings.

In other forms of eyeglass cases, where neither the lenses nor bridge is clamped, the eyeglasses are free to move and strike the front, rear and end walls of the tray, thus receiving severe shocks or impacts whenever the eyeglass case strikes or collides with a solid object, the only cushioning means being the usual lining of velvet or other fabric.

In the present invention the main object is to overcome and avoid or eliminate the disadvantages which experience and experiments have disclosed in previously known eyeglass cases.

A further object is to provide an eyeglass case combination or non-defacing means that is very effective in preventing breakage of eyeglasses contained therein, and that is so simple as to be capable of being manufactured at a very slight advance in cost as compared with eyeglass cases of usual construction. The term non-defacing is meant to distinguish from such as rubber that causes discoloration of spectacle and eyeglass frames that contain silver, etc.

Other objects and important features are pointed out or implied in the following details of description, in connection with the accompanying drawing in which:

Fig. 1 is an enlarged vertical sectional view of an eyeglass case combination constructed according to a very practical form of our invention, the section being taken along line 1—1 of Fig. 2.

Fig. 2 is a longitudinal vertical sectional view, the section being taken along line 2—2 of Fig. 1, and parts of the fabric lining omitted, the hinged cover being broken away at an uneven line near the hinge.

Fig. 3 is a plan view of a blank from which is formed the front impact-dispelling spring.

Referring to the drawing in detail, in which, similar reference numerals refer to similar parts in the several views, the invention is described in detail as follows:

The tray 5 may be of the shape shown or of any appropriate shape and size, according to the kind and size of eyeglasses to be contained therein, and may be of any suitable sheet metal or other material. The outer cover 6 may also be of any appropriate material, or may be omitted if desirable. The cover or closure 7 may also be of any appropriate shape and material or materials, hinged to the tray at 8, and provided with spring-means 9 (of previously known construction) for yieldingly holding the cover or lid 7 in both open and closed positions. The hinge 8 is on the rear wall 10 of the tray whose front wall is shown at 11, and end-walls at 12.

Elastic cushions 13, preferably of doubled-faced deep plush, are secured to the tray and cover or lid by any appropriate means which may include plush or velvet linings 14 and 15 that are glued or otherwise secured in their respective positions as shown; and while these plush-covered double-faced deep plush cushions are very soft and resilient, they are sufficiently spaced, the upper from the lower, to eliminate clamping of the respective lenses when the lid or closure 7 is held in its closing position by the spring-means 9, therefore subjected to no torsion or strain.

Additional shock-absorbing or impact-dispelling means are provided by properly formed and placed ribbon-springs, viz., very thin, elastic easily yielding strips of sheet metal or other appropriate material, secured to the interior surface of the eyeglass case, as follows:

Ribbon-spring 16 includes a substantially straight portion that extends along and substantially from bottom to top of the rear wall 10, in spaced parallel relation to the latter and has its central part secured to the bottom of the tray by any appropriate means which may be a portion 14a upturned from the tray-bottom and glued to the spring 16, but while the part 14a is somewhat yielding, its elasticity is preferably supplemented by a spring 17 soldered or otherwise secured thereto at 18 and bearing against the rear wall 10. This ribbon-spring 16 has curved end-extensions 16a in spaced parallel relation to the end-walls 12; and springs 19 cooperate with the securing elements 14a for yieldingly holding the ribbon-spring in the desired spaced relation to the rear and end walls of the tray. The springs 19 are preferably between and secured to both the end-walls and the spring-extensions 16a at intermediate parts of the latter, thereby normally securing the ends of the straight part of spring 16 in their spaced relation to the rear wall, while permitting said ends to be easily pressed towards said rear wall whenever an impact on the rear wall causes the eyeglasses or either lens thereof to strike the straight part of the ribbon-spring, thereby effectively absorbing the shock or dispelling the impact of the eyeglasses or spectacles.

Ribbon-spring 20 is formed from a blank substantially of the form shown in Fig. 3, and is of the bow-shape shown in Fig. 2; and its middle part is secured to the front-wall 11 by any appropriate means, the means here illustrated at 21 being a piece of the lining fabric glued to the spring and to the front wall. The bowed portions 20a are in the proper position to receive and dispel impact of the respective lenses if the front wall 11 collides with a solid object. Referring again to the bowed portions 20a, it will be seen that they may be considered as multi-bowed, viz., the blank (Fig. 3) has oppositely bowed or arcuate edges, and these bowed portions are additionally bowed by bending the blank. The bowed or arcuate edges prevent the edges of the lenses and temples of the eyeglasses from passing between these springs and the hood 5a of the tray 5, for all these springs extend substantially from bottom to top of the walls to which they are adjacent, while the narrow middle and ends are capable of being disposed in the limited space adjacent to the front wall.

The thickness of the ribbon-springs and spring 17 is greatly exaggerated in the drawing; for in practice, if these springs are of steel, they are only about .003 to .005 of an inch in thickness; but if made of some non-metallic material, it might be .01 of an inch or more in thickness; so the adjective "ribbon" is used in its broad sense, describing a spring that is flat, thin and very flexible.

Springs such as at 19 may be used instead of the one shown at 17, and vice versa. In fact, numerous changes may be made in the construction and arrangement and kinds of materials, within the scope of the inventive ideas as implied and claimed. However, it is very important that the material of the springs be non-defacing, viz., incapable of defacing or discoloring the lenses or the metal parts of the spectacles or eyeglasses, as by emitting any gas or vapor, such as that of rubber, for instance, causing oxidation of silver and other metals and alloys generally used in the construction of spectacles and eyeglasses.

We claim our invention as follows:

1. The combination with an eyeglass and spectacle case that includes a tray having a rear wall and end-walls that have upper and lower edges, and a lid normally closed on said walls; of cushions secured to said tray and lid in a proper correlation for receiving lenses of eyeglasses therebetween, and ribbon spring portions secured to said tray and extending along said rear wall substantially from end to end of the latter and thence at least to the middle of each end wall, said ribbon spring having portions spaced from said walls and in proper position to receive and dispel impacts of the respective lenses if any of said walls collide with a solid object.

2. The combination defined by claim 1, and spring means yieldingly connecting said ribbon spring to said end-walls, said spring-means being between said end walls and intermediate parts of said ribbon-spring.

3. The combination defined by claim 1, said tray having a front wall which has lower and upper edges, and a ribbon spring extending along said front wall substantially from end to end of the latter and secured to said tray and extending substantially from the lower edge to the upper edge of said front wall, the second said ribbon-spring having parts spaced from said front wall and in proper positions to receive and dispel impacts of edges of said lenses if said front wall collides with a solid object.

4. The combination defined by claim 1, and spring means yieldingly connecting said ribbon spring to said end-walls, said spring-means being between said end walls and intermediate parts of said ribbon spring.

5. The combination with an eyeglass and spectacle case that includes a tray having a front wall and rear wall and opposite end-walls, and a lid hinged to the rear wall; of cushions secured to the tray and lid and having respectively upper and lower surfaces spaced in proper cooperative relation to receive lenses of eyeglasses therebetween, and yielding springy non-defacing means including portions of ribbon-spring that extend along the entire length of said rear wall and thence at least to the middle of each of said end-walls and substantially from end to end of said front wall in a proper position to receive and dispel impacts of the edges of the respective lenses if any rear or front or end of the spectacle case collides with a solid object.

6. The combination with an eyeglass and spectacle case that includes a tray having a rear wall and opposite end walls, a lid on the tray and normally closed against said walls, and cushions secured to said tray and lid and having respectively upper and lower surfaces spaced in proper cooperative relation to receive lenses of eyeglasses therebetween in non-clamping relation; of non-defacing springy means including portions of ribbon spring secured to said tray and extending approximately entirely along said walls and substantially from the lower edge to the upper edge of each of said walls and having parts spaced from said walls in proper position to receive and dispel impacts of edges of the respective lenses if any one of said walls collides with a solid object.

ERNEST H. WARCH.
HERBERT H. HUPFELDT.